March 17, 1959     J. C. HOBBS     2,878,041
CLAMPED FLANGE JOINT WITH MEANS FOR MAINTAINING A
FLUID SEAL UNDER VARYING TEMPERATURE CONDITIONS
Filed Sept. 30, 1954
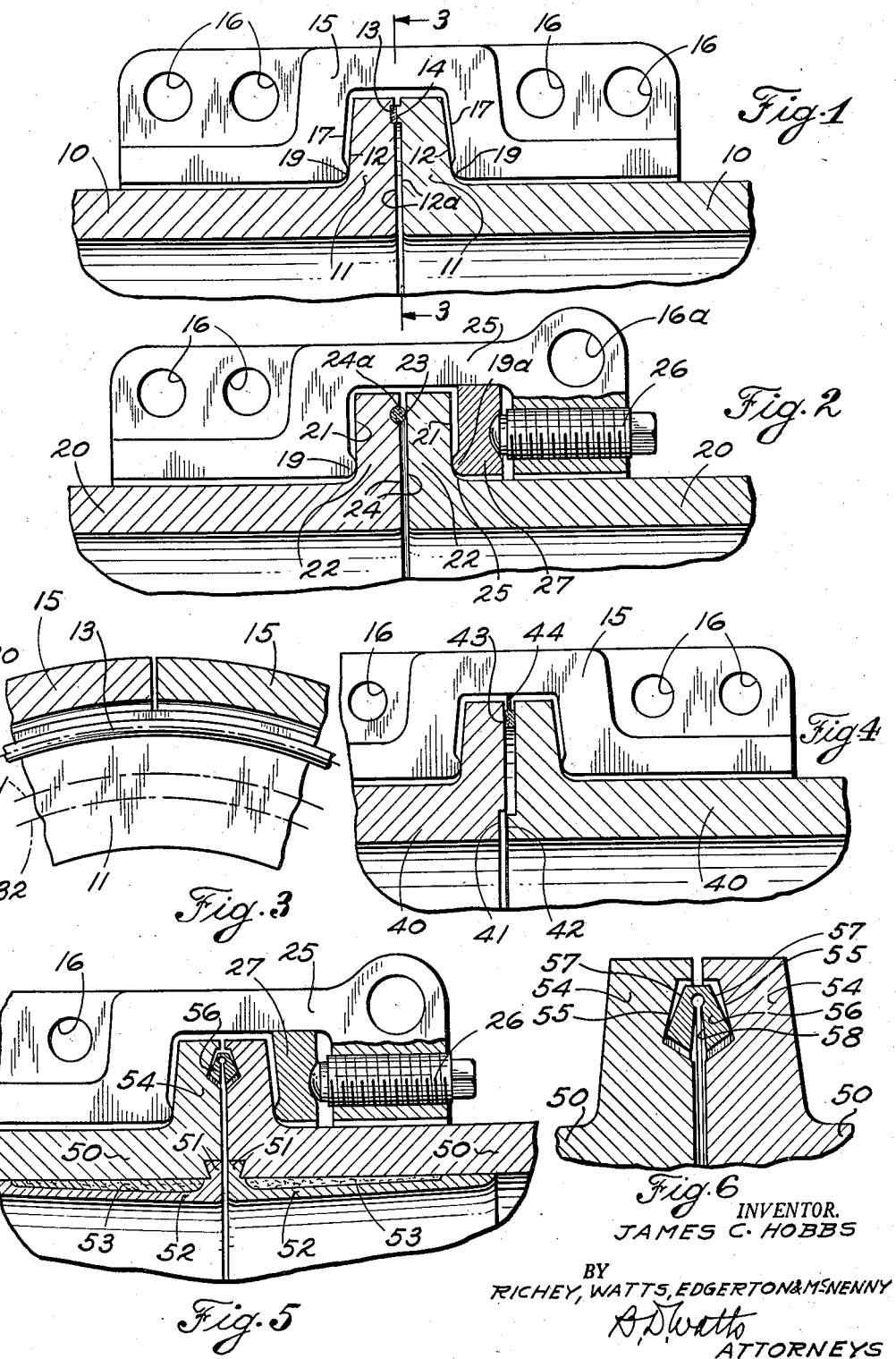
INVENTOR.
JAMES C. HOBBS
BY
RICHEY, WATTS, EDGERTON & McNENNY
ATTORNEYS United States Patent Office 2,878,041
Patented Mar. 17, 1959

2,878,041

CLAMPED FLANGE JOINT WITH MEANS FOR MAINTAINING A FLUID SEAL UNDER VARYING TEMPERATURE CONDITIONS

James C. Hobbs, Coral Gables, Fla.

Application September 30, 1954, Serial No. 459,290

6 Claims. (Cl. 285—367)

This invention relates generally to seals for pressure vessels and is particularly concerned with a new joint for pipes and pressure chambers which will remain fluid-tight in service regardless of the relative axial movement of portions of the members between which the seal is made.

This application is a continuation-in-part of my co-pending application, Serial No. 163,696, filed May 23, 1950, and now Patent No. 2,695,184, issued on November 23, 1954.

The problem of controlling fluid at high pressure has long been difficult when the fluid temperature is low and becomes even more difficult as the temperature of the fluid increases. This difficulty is traceable in part to the fact that the forces applied to the metal of the joint are greatly increased as the temperatures increase and may even be sufficient to exceed the elastic limits of the parts. The danger of permanently deforming the parts of the joint is increased at the higher temperatures where the strength of the metals is lower.

In the case of horizontal conduits carrying fluid at high pressure and high temperature, the bottom part of the conduit is always lower in temperature than the upper part and this difference often amounts to between 50° F. and 150° F. When such fluid is superheated steam and some of it condenses and collects on the bottom of the pipe, the temperature difference may exceed 500° F. Such differences are reflected in unequal expansion of the conduits which manifests itself disastrously at junctions and seals. For example, where two such horizontal pipes are connected together by bolts in their transverse end flanges, the rigidity of the pipes is so great that the bolts at the bottom of the pipe will be stretched and the joint will leak unless the gasket between the flanges has sufficient local resilience to exceed the local axial shrinkage of the pipe.

Forces applied to the parts of a conventional seal are varied by the relative amounts of expansion of the parts constituting the joint. The difference in amounts of expansion of such parts may be due to a difference in the temperatures of the parts, or to a difference in the coefficients of expansion of the parts. Often both of these causes are present in a given instance and frequently other causes are also present. When there is any difference in the amounts of expansion of the parts constituting the joint, the difficulty of maintaining the joint fluid-tight is greatly magnified as compared with the conditions which would exist in the absence of such differences. This sealing problem is particularly acute where, for example, gases at a temperature of 750° F. or more and at a pressure of 600 pounds per square inch or more are present at a joint, for example, between a pipe which consists of a low expansion metal or alloy and another pipe which consists of a high expansion metal or alloy. A rigid connection between two such pipes may cause stress increases of as much as 50,000 p. s. i. in tension and compression when the temperature increases from 100° F. to 1000° F.

Many efforts have been made over a period of years to provide a suitable mechanical joint that could be maintained tight against leakage of fluids at high pressures and/or high temperatures. However, so far as I know, none of those efforts have solved the problem.

The present invention aims to solve this problem and achieves that aim by providing a fluid-tight joint between two members of a closure in which the pressure sealing action increases with any relative axial movement of either member or portions thereof. Such axial movement may be traceable to expansion or contraction of the pipe assembly, a difference in the amount of expansion or contraction of a portion of one member of the assembly, an increase or decrease in pressure of the confined fluid, or other causes.

This invention is predicated on the discovery that the centers of gravity of a plurality of narrow sectors collectively constituting an annular flange are located on a circle having a radius equal approximately to two thirds of the radius of the sector; and that the above described sealing action may be realized by locating the sealing gasket on a circle having a greater radius than the circle of the centers of gravity and supporting and clamping the sectors on a circle between the circle of the centers of gravity and the circle of the seal. If a sector is subjected to uniform loading, such as fluid under pressure, the total force exerted on the sector may be considered as being concentrated at its center of gravity. If the sector is supported between its center of gravity and its outer edge, the support becomes a fulcrum and pressure acting in one direction on the sector will tend to rotate the sector about that fulcrum and move the outer edge in the opposite direction. By locating an annular gasket on a circle near the outer edges of the annular flanges of a fluid joint and supporting the flanges on a circle having a radius less than that of the gasket and greater than that of the centers of gravity of the sectors constituting the flanges, i. e., greater than two thirds of the radius of the gasket, any increase in fluid pressure or temperature which urges the members apart causes the sectors or flanges to rotate about the supports and to increase the pressure sealing load on the gasket. In the event the members move axially toward each other there is no fulcrum required since there is a direct compression of the gasket. A pipe joint subjected to bending stresses might have both conditions at the same time.

An additional advantage is gained by locating the gasket near the outer edge of the flared portion of the members. The adverse effect on the gaskets of the quick changes of temperature that take place at the interior surfaces of the pipe will be far less since the gasket is removed from the immediate area of the fluid.

A further advantage of this arrangement of members is that the members do not contact to transmit axial loads at the inner diameters of the opposed surfaces, thus permitting the internal surface, and adjacent portions, of the conduits to expand and contract without overloading the clamping means. As the opposed surfaces of the flared portions increase in temperature over the remote surface there will be a backward bending of the flared portion to partially compensate for axial expansion of the piping assembly.

A still further advantage of the invention is the elimination of bolts in tension to carry high loads. The joints using this invention are safe, strong, simple, light in weight, and contain but a few parts.

The present invention will be better understood by those skilled in the art from the following specification and the accompanying drawings of apparatus embodying the present invention in which:

Fig. 1 is a longitudinal sectional view of one form of pipe joint;

Fig. 2 is a similar section of a modified form of pipe joint;

Fig. 3 is a fragmentary view taken on lines 3—3 of Fig. 1, showing diagrammatically the location of forces in the joint of Fig. 1;

Fig. 4 is similar to Fig. 1 but shows another modified form of pipe joint;

Fig. 5 shows a further modified form of pipe joint as shown in Fig. 1; and

Fig. 6 is a fragmentary enlarged sectional view of the gasket and flanges of Fig. 5.

The embodiment of the present invention which was shown in Fig. 7 of my aforesaid copending application and which is illustrated in Fig. 1 comprises two aligned pipes 10 each having a flared end portion or flange 11. End portions 11 are provided with outwardly converging outer or remote surfaces 12 and a gasket 13 is set into a recess in one of the opposed substantially parallel, inner surfaces 12a of the flanges while the other opposed inner surface has a projection 14 extending loosely into that recess and pressing against the gasket therein. The ring 15 is divided lengthwise into two or more parts which are held together as by bolts in holes 16. This ring has inwardly diverging surfaces 17 substantially parallel to remote surfaces 12 but each is provided with an annular rib 19 to engage with the opposed surface 12a with an annular line contact. The outer surfaces 12 converge outwardly at a small included angle of approximately 13°. When ring 15 is clamped over flared portions 11 by means of bolts through holes 16, the annular ribs 19 will urge the pipes 10 together and gasket 13 will be pressed into fluid sealing contact with the opposed surfaces.

In Fig. 2 the pipes 20 are similar to pipes 10 shown in Fig. 1 except that the remote surfaces 21 of the flared or flanged portions 22 are substantially parallel, or form a small included angle. Gasket 23 is partly recessed in a groove 24a of the opposed surfaces 24 of the portions 22 and projects therebeyond and into engagement with the opposed surface 24. This groove 24a preferably has a radius greater than that of the gasket with the result that the gasket makes an initial line contact with the surface of the groove and with the opposed surface 24; and the gasket may adjust itself to slight variations in the location and finish of the groove. Ring 25 is similar in some respects to ring 15 of Fig. 1. It has holes 16 to receive bolts and it has one annular rib 19. However, it differs from ring 15 in having, at its remote end a single hole 16a for a bolt, a threaded hole to receive screws 26 which bear against the outer side of a ring 27 which has an annular rib 19a similar to rib 19 of ring 25. By adjusting screws 26 in ring 25 the ribs 19 and 19a may be pressed against the remote surfaces of flanges 22 with the force necessary to press surfaces 24 of the flanges against gasket 23 with the desired sealing pressure.

Fig. 3 shows fragmentarily a sector-like part of the pipe joint shown in Fig. 1. The flange 11 is surrounded by ring member 15 which is quite like ring 15 of Fig. 1 and carries gasket 13. Line 30 represents the sealing circle of the fluid-tight joint formed at gasket 13. Line 31 represents the support circle which is the contact of rib 19 with surface 12 of flange 11 and which is concentric with line 30. Line 32 represents a circle which has a radius equal to two thirds of the radius of circle line 30.

Fig. 4 shows another embodiment of the present invention. Pipes 40 are similar to pipes 10 of Fig. 1 except that one pipe has an annular recess 41 and the other pipe has a corresponding annular projection 42, the recess and projection serving to maintain the pipes in axial alignment. The form of gasket 43 as shown is located between the opposed surfaces and has a positioning ring or fingers 44 extending from the outer surface to engage the surrounding ring 15 and thereby to hold the gasket in position during assembly of the joint.

Fig. 5 shows another modification of the present invention. The pipes 50 have annular recesses 51 at the inner edges of the opposed surfaces to receive annular shoulders on heat-flow-retarding sleeves 52 which lie close to the inner surfaces of the pipes in their adjacent ends. If desired, insulation 53 may be carried in recesses in the outer surface of the sleeves further to impede the flow of heat into and out of the joint. Ring 25, screws 26 and ring 27 are similar to the similarly numbered parts shown in Fig. 2. Flared portions or flanges 54 are each provided with an annular recess defined in part by outwardly converging opposed surfaces 55 to receive gasket 56. This gasket is composed of metal, has outwardly converging remote surfaces 57 which define initially small included angles with the opposed outwardly converging surfaces 55, and has a radial split 58 which permits some relative movement of the inner portion separated by the split.

It is to be understood that in each of the above described modifications a closure or blank flange of suitable shape may substituted for one of the pipes.

As will be noted from the drawings, each of the above described modifications has a support circle which lies between the sealing circle and a circle having a radius equal to two thirds of the radius of the sealing circle. When the sealing and support circles are arranged approximately as so described and shown, the joint operates as has been described above, i. e., whether the pipes move axially toward or away from one another, force is applied to the gasket which maintains its sealing action, the flanges fulcruming about the ribs constituting the support circles. Thus a fluid-tight joint is maintained regardless of the axial expansion and contraction or mechanical movement of the pipes.

It will also be noted that in the several illustrative embodiments of the invention, the ring or clamp such as 15 of Fig. 1 and corresponding clamps of the other figures, has the supporting ribs positioned substantially at right angles to the centerline of the pipes and has bolts connecting the ends of the ring or clamp such as 15 which bolts also extend transversely of the centerline of the pipes. By reason of these two factors, the bolts are subjected to relatively small tensile stresses even when powerful forces are tending to move the pipes axially apart. In structures where the clamp-securing bolts have their axes parallel to the centerline of the pipes, the tensile stresses exerted on the bolts by the forces tending to move the pipes axially apart would be many times the tensile stresses applied to the clamping bolts positioned as shown and described hereinabove. Hence, the present invention makes it possible to reduce the number and size of the clamping bolts and to use material having less strength than would be the case with the prior conventional structure just mentioned.

It will also be noted that the normal positions of the said pipes or members are as shown and that said positions may change when the members are heated or cooled. Also the said members have physical characteristics which may vary under different thermal conditions. However, the changes in positions and characteristics may take place without material deformation of the clamp.

The ribs 19 make substantially line contacts only with the remote surfaces of the flanges. The clamps overlie the flanges, extend axially in opposite directions therefrom and are so configured and dimensioned that the rigidity factor of each clamp is greater than the sum of the rigidity factors of both flanges associated therewith.

Having thus described the present invention so that others skilled in the art may be able to understand and practice the same, I state that what I desire to secure by Letters Patent is defined in what is claimed.

What is claimed is:

1. A fluid tight joint comprising a tubular member and another member partly defining a chamber for fluid, said members having normal positions and characteristics, said members having flanges provided with opposed, substantially parallel annular surfaces and remote annular surfaces extending outwardly and disposed between substantial parallelism and outward convergence at a small included angle, the walls of said members and flanges being approximately equal in thickness, an annular gasket short in radial cross section as compared with the radial length in cross section of the opposed surfaces, said gasket being positioned between said opposed surfaces on a seal circle near the outer edges of said opposed surfaces and spacing said opposed surfaces apart from the gasket to the inner edges thereof a distance sufficiently long axially of the members to permit normal expansion of said members without engagement of the opposed surfaces near their inner edges, and a clamp overlying the outer edges of the flanges, extending axially in both directions therefrom, and making substantially line contacts with the remote surfaces of the flanges only on a support circle which has a radius greater than two thirds of the radius of the seal circle and less than the minimum radius of the latter, the clamp being so configured and dimensioned that it has a rigidity factor greater than the sum of the rigidity factors of the flanges, whereby the said normal positions and characteristics may change without material deformation of the clamp and means extending thru the clamp on opposite sides of the flanges to secure the clamp in assembled position with the members.

2. The combination of elements set forth in claim 1 in which a ring is disposed around one tubular member between one flange and the clamp and has an annular rib which makes one of said line contacts with one flange.

3. The combination of elements set forth in claim 1 in which a ring is disposed around one tubular member between one flange and the clamp and has a rib to make one of said line contacts and in which an adjusting screw extends thru the clamp to engage and press said ring toward said flange.

4. The combination of elements set forth in claim 1 in which the gasket is seated in a groove in one of the flanges.

5. The combination of elements set forth in claim 1 in which the gasket is disposed within a groove in one flange and the other flange has an annular projection extending into said groove engaging the gasket and engageable with the groove side walls whereby axial alignment of said members is maintained.

6. The combination of elements set forth in claim 1 in which means is provided for maintaining the gasket on the seal circle.

References Cited in the file of this patent

UNITED STATES PATENTS

| | | |
|---|---|---|
| 184,599 | Ehrhardt | Nov. 21, 1876 |
| 613,053 | Bates | Oct. 25, 1898 |
| 1,866,160 | Griswold | July 5, 1932 |
| 2,077,035 | Bredeson | Apr. 13, 1937 |
| 2,105,022 | Wilson et al. | Jan. 11, 1938 |
| 2,166,412 | Kiesel | July 18, 1939 |
| 2,335,040 | Bruno | Nov. 23, 1943 |
| 2,512,294 | Arbogast | June 20, 1950 |
| 2,547,321 | Henderson | Apr. 3, 1951 |
| 2,695,184 | Hobbs | Nov. 23, 1954 |

FOREIGN PATENTS

| | | |
|---|---|---|
| 14,718 | Great Britain | Oct. 13, 1888 |
| 91,015 | Germany | 1897 |
| 2,310 | Great Britain | Jan. 30, 1904 |
| 548,314 | Germany | Apr. 11, 1932 |
| 485,291 | Great Britain | May 16, 1938 |